US012737890B2

(12) United States Patent
Minabe et al.

(10) Patent No.: US 12,737,890 B2
(45) Date of Patent: Sep. 15, 2026

(54) INFORMATION PROCESSING APPARATUS, NON-TRANSITORY COMPUTER READABLE MEDIUM, AND INFORMATION PROCESSING METHOD

(71) Applicant: FUJIFILM Business Innovation Corp., Tokyo (JP)

(72) Inventors: Jiro Minabe, Kanagawa (JP); Tsutomu Ishii, Kanagawa (JP); Atsushi Ito, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/178,597

(22) Filed: Mar. 6, 2023

(65) Prior Publication Data

US 2024/0087129 A1 Mar. 14, 2024

(30) Foreign Application Priority Data

Sep. 14, 2022 (JP) ................................. 2022-146515

(51) Int. Cl.
*G06T 7/11* (2017.01)
*G06T 7/136* (2017.01)

(52) U.S. Cl.
CPC ................ *G06T 7/11* (2017.01); *G06T 7/136* (2017.01); *G06T 2207/10024* (2013.01); *G06T 2207/30176* (2013.01)

(58) Field of Classification Search
CPC ....................... G06T 7/11; G06T 7/136; G06T 2207/10024; G06T 2207/30176; G06T 7/162; G06T 2207/20081; G06T 7/143; G06T 2207/20084; G06V 30/1908; G06V 30/418
USPC ......................................................... 382/173
See application file for complete search history.

(56) References Cited

U.S. PATENT DOCUMENTS

| | | | | |
|---|---|---|---|---|
| 10,572,990 | B2 * | 2/2020 | Yoshitake | G06T 7/74 |
| 2011/0157161 | A1 * | 6/2011 | Choi | G09G 3/003 345/419 |
| 2012/0229832 | A1 * | 9/2012 | Tsujimoto | H04N 1/4413 358/1.13 |
| 2015/0058711 | A1 * | 2/2015 | Zeng | G06F 3/04886 715/234 |
| 2021/0097275 | A1 * | 4/2021 | Miyauchi | G06V 30/418 |
| 2023/0419707 | A1 * | 12/2023 | Shoji | G06N 3/08 |

FOREIGN PATENT DOCUMENTS

| | | | |
|---|---|---|---|
| JP | 3062258 | B2 | 7/2000 |
| JP | 2002-312385 | A | 10/2002 |
| JP | 2005-208978 | A | 8/2005 |

(Continued)

OTHER PUBLICATIONS

May 26, 2026 Office Action issued in Japanese Patent Application No. 2022-146515.

*Primary Examiner* — Ali Bayat
(74) *Attorney, Agent, or Firm* — Oliff PLC

(57) ABSTRACT

An information processing apparatus includes a processor configured to: perform, on image data representing multiple documents, an operation that identifies a segmentation position that segments the documents according to a document unit; and cause a display to display identification results in a display format that is responsive to a certainty factor of the identification results.

16 Claims, 19 Drawing Sheets

(56) References Cited

FOREIGN PATENT DOCUMENTS

| | | | |
|---|---|---|---|
| JP | 2007-087197 | A | 4/2007 |
| JP | 2021-057783 | A | 4/2021 |
| JP | 2021-111062 | A | 8/2021 |
| JP | 2021-194695 | A | 12/2021 |

* cited by examiner

FIG. 1

10
INFORMATION PROCESSING APPARATUS
12
IMAGE ACQUISITION APPARATUS
14
TERMINAL APPARATUS

ABCDEFG
HIJK
AMOUNT OF SALES
AMOUNT OF SALES

FIG. 5

| | | | | DIFFERENCE BETWEEN FEATURE VALUES OF PAGES | |
|---|---|---|---|---|---|
| | | | | DIFFERENCE FROM PRIOR PAGE | DIFFERENCE FROM SUBSEQUENT PAGE |
| STRUCTURE | PAGE APPEARANCE: IMAGE STRUCTURE | SHEET SIZE | LENGTH | ... | ... |
| | | | WIDTH | | |
| | | | LENGTH × WIDTH | | |
| | | VERTICAL LENGTH/ HORIZONTAL LENGTH | LENGTH / WIDTH | | |
| | | DRAWING (DETECTING STRAIGHT LINE) | NUMBER OF (LONG) HORIZONTAL LINES | | |
| | | | NUMBER OF (MEDIUM-LENGTH) HORIZONTAL LINES | | |
| | | | ... | | |
| | | DRAWING (DETECTING CIRCLE) | HOUGH TRANSFORM | | |
| | | | ... | | |
| | | DRAWING (DETECTING POLYGON) | SIZE OF CIRCLE | | |
| | | | ... | | |
| | | COLOR (REPRESENTATIVE COLOR) | B VALUE_ 1-6 | | |
| | | | ... | | |
| | TEXT | TEXT BLOCK | QUANTITY | | |
| | | | MAXIMUM SIZE | | |
| | | | AVERAGE SIZE | | |
| | | | ... | | |
| | | PARAGRAPH | QUANTITY | | |
| | | | MAXIMUM SIZE | | |
| | | | ... | | |
| | | WORD | SPATIAL ARRANGEMENT | | |
| | | | ... | | |
| | | NUMBER OF CHARACTERS | TOTAL NUMBER OF CHARACTERS | | |
| | | | ... | | |
| | | FONT SIZE | MAXIMUM SIZE | | |
| | | | ... | | |
| | | TYPE OF CHARACTERS | NUMBER OF LOWER CASE LETTERS | | |
| | | | RATIO OF LOWER CASE LETTERS | | |
| | | | NUMBER OF NUMERALS | | |
| | | | NUMBER OF ROMAN NUMERALS | | |
| | | | ... | | |
| | | | NUMBER OF HIRAGANAS | | |
| | | | ... | | |
| MEANING | TEXT | WORD | KEYWORD | | |
| | | | ... | | |
| | | SENTENCE | LANGUAGE MODEL | | |
| | TABLE | | | | |
| | DRAWING | | | | |

FIG. 9

| CERTAINTY FACTOR OF SEGMENTATION POSITION | COLOR |
|---|---|
| HIGH | BLUE |
| MEDIUM | LIGHT-BLUE |
| LOW | WHITE |

74
72
70
68
66
64
78
76
A
B
C
D
E
F
G
H
I
J
K
L 90
88
86
84
82
80
94
92
A
B
C
D
E
F
G
H
I
J
K
L 136
134
H
G
F
A
B
C
D
E
I 142
140
138
H
G
F
A
B
C
D
E
I 150
152
164
154
166
156
ABCDEFG
158
HIJK
168
160
AMOUNT OF SALES
162
AMOUNT OF SALES

INFORMATION PROCESSING APPARATUS, NON-TRANSITORY COMPUTER READABLE MEDIUM, AND INFORMATION PROCESSING METHOD

CROSS-REFERENCE TO RELATED APPLICATIONS

This application is based on and claims priority under 35 USC 119 from Japanese Patent Application No. 2022-146515 filed Sep. 14, 2022.

BACKGROUND

(i) Technical Field

The present disclosure relates to an information processing apparatus, a non-transitory computer readable medium, and an information processing method.

(ii) Related Art

When image data includes multiple document, the documents represented by the image data may be occasionally segmented according a document unit.

Japanese Unexamined Patent Application Publication No. 2021-57783 discloses an image processing apparatus. When the documents are scanned, the image processing apparatus segments the documents according to file, checks a document of a file against a registered document, and then recommends to each document an index item, such as a file name.

It is contemplated that multiple documents are segmented according to a document unit by performing an operation, such as an image processing operation, to image data representing the documents. In such a case, a user may correct the segmentation results depending on the accuracy of identifying the segmentation position.

SUMMARY

Aspects of non-limiting embodiments of the present disclosure relate to allowing a user to visually recognize a difference in the identification accuracy when an operation to identify a segmentation position, at which image data representing multiple documents is segmented according to a document unit, is performed.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to: perform, on image data representing multiple documents, an operation that identifies a segmentation position that segments the documents according to a document unit; and cause a display to display identification results in a display form that is responsive to a certainty factor of the identification results.

BRIEF DESCRIPTION OF THE DRAWINGS

Exemplary embodiment of the present disclosure will be described in detail based on the following figures, wherein:

FIG. 1 is a block diagram illustrating an information processing system;

FIG. 3 illustrates an example of image data;

FIG. 5 illustrates a table as a result of extracting feature values;

FIG. 9 illustrates a table that associates a certainty factor of the segmentation position with a display format;

DETAILED DESCRIPTION

Figure 1:
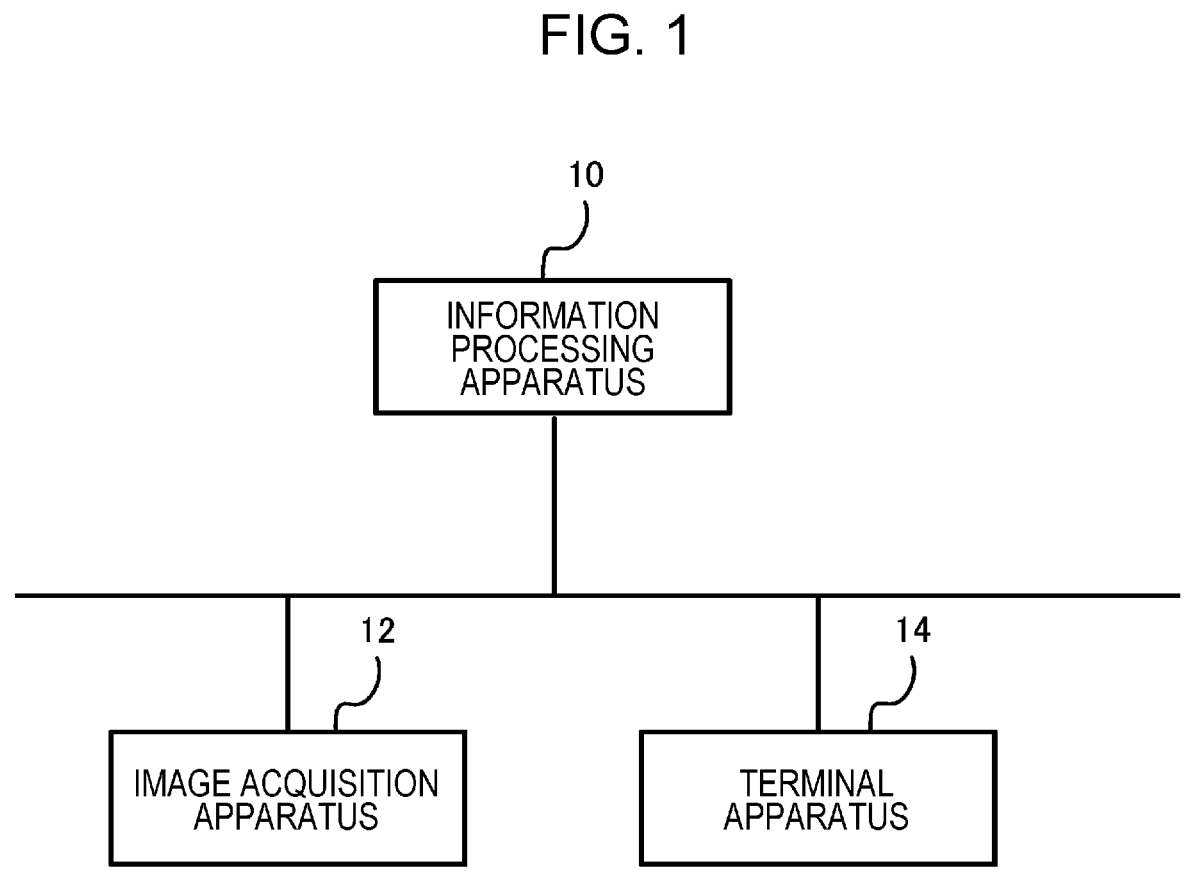
Figure 2:
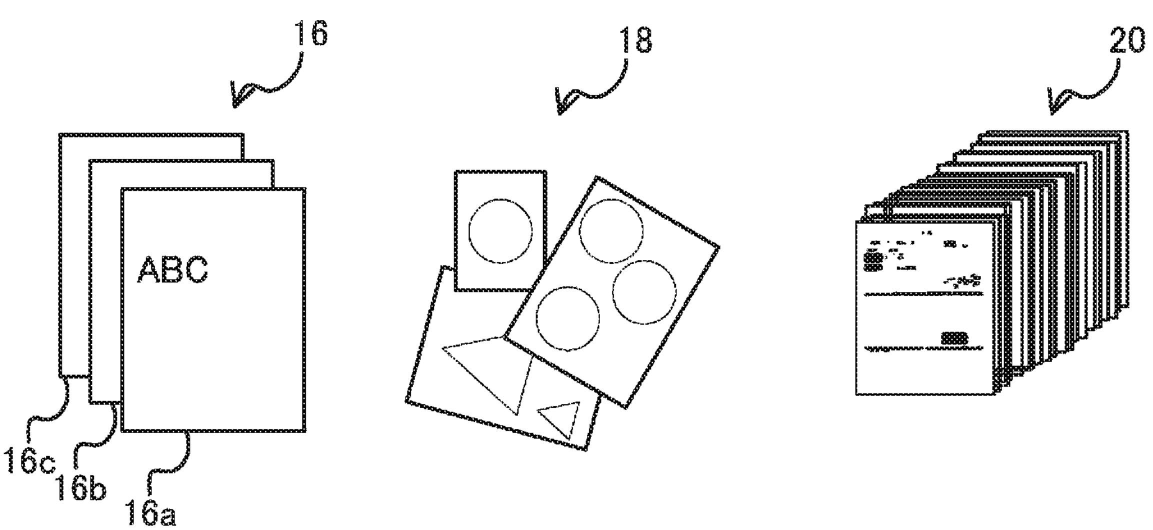
FIG. 2 illustrates an example of multiple documents.

FIG. 1 is a block diagram illustrating an information processing system. According to the exemplary embodiment, the information processing system includes an information processing apparatus 10, image acquisition apparatus 12, and terminal apparatus 14. Each of the information processing apparatus 10, image acquisition apparatus 12, and terminal apparatus 14 has a function of communicating with another apparatus. For example, the information processing apparatus 10, image acquisition apparatus 12, and terminal apparatus 14 communicate with each other via a communication network, such as the Internet or a local-area network (LAN).

The information processing system of the exemplary embodiment performs on image data representing multiple documents an operation to identify a position of segmentation (segmentation position) where multiple documents are segmented according to a document unit. Identification results are displayed in a display format responsive to a specific certainty factor of identification results. For example, the segmentation position serving as an example of the identification results is displayed in the display format responsive to the certainty factor of the identification results.

The information processing apparatus 10 receives the image data representing the documents, identifies a position where the documents are segmented according to a document unit, and displays on a display a display format that is responsive to the certainty factor of the identification results (for example, the segmentation position). For example, the information processing apparatus 10 is a personal computer (PC), image processing apparatus, or server. The image processing apparatus has at least one function selected from the group consisting of a scan function, print function, and copy function. The image processing apparatus may be a multi-function apparatus including the scan function, print function, and copy function.

The operation to identify the segmentation position according to the document unit may be performed by the information processing apparatus 10 or an apparatus other than the information processing apparatus 10. If the operation to identify the segmentation position according to the document unit is performed by the other apparatus, information indicating the identification results is transmitted from the other apparatus to the information processing apparatus 10. In response to the reception of the information, the information processing apparatus 10 causes a display to display the segmentation position by changing the display format in response to the certainty factor of the identification results.

The exemplary embodiment is described, based on the assumption that the operation to identify the segmentation position according to the document unit is performed by the information processing apparatus 10. Alternatively, the operation may be performed by the other apparatus.

The image acquisition apparatus 12 acquires the image data. The image acquisition apparatus 12 may be an image scanner or a photographing apparatus, such as a camera. If the image acquisition apparatus 12 is an image scanner, a hardware document may be scanned with the scan function of the image acquisition apparatus 12 and the image data representing the document may thus be created. If the image acquisition apparatus 12 is the photographing apparatus, the hardware document may be photographed with the photographing function of the image acquisition apparatus 12 and the image data representing the document may be created. The image data is transmitted to the information processing apparatus 10 via, for example, a communication network. The image data may be transmitted to the terminal apparatus 14 via the communication network.

The image acquisition apparatus 12 may be included in the information processing apparatus 10. In such a case, the image data may be created by implementing the scan function or photographing function. For example, the image acquisition apparatus 12 may be a PC, tablet PC, or smart phone. For example, the image acquisition apparatus 12 includes a communication device, user interface, memory, and processor. The processor of the image acquisition apparatus 12 is an example of a first processor.

The terminal apparatus 14 receives the image data and displays an image responsive to the image data. The image data may be transmitted from the image acquisition apparatus 12 to the terminal apparatus 14 or from the information processing apparatus 10 to the terminal apparatus 14. For example, the terminal apparatus 14 is a PC, tablet PC, or smart phone. For example, the terminal apparatus 14 includes a communication device, user interface, memory, and processor. The user interface includes a display, and the image is displayed on the display. The processor of the terminal apparatus 14 is an example of a third processor.

An image responsive to the image data representing multiple documents may be displayed on a display of the terminal apparatus 14 or a display of the information processing apparatus 10. As described below, the terminal apparatus 14 may be used by the user to make an operation on a screen of the display, for example, to correct the segmentation position.

The document includes one or more pages having characters, symbols, drawings, and/or images. For example, paper documents or business documents around users are examples of the document. The documents have a variety of formats and physical sizes. The exemplary embodiment is not limited to any particular type or shape of document.

FIG. 2 illustrates an example of multiple documents. A document 16 is a business document (such as a report, a business form, a sales slip, an invoice, or the like). A document 18 is a paper document around a user. A document 20 is a large quantity of stored documents. For example, the document 16 includes three pages (for example, pages 16*a*, 16*b*, and 16*c*).

The image acquisition apparatus 12 scans multiple documents in batch, creating the image data representing the documents. The scanning method is not limited to scanning all documents in batch. Image data originally representing multiple documents may be used as image data of the exemplary embodiment.

Figure 3:
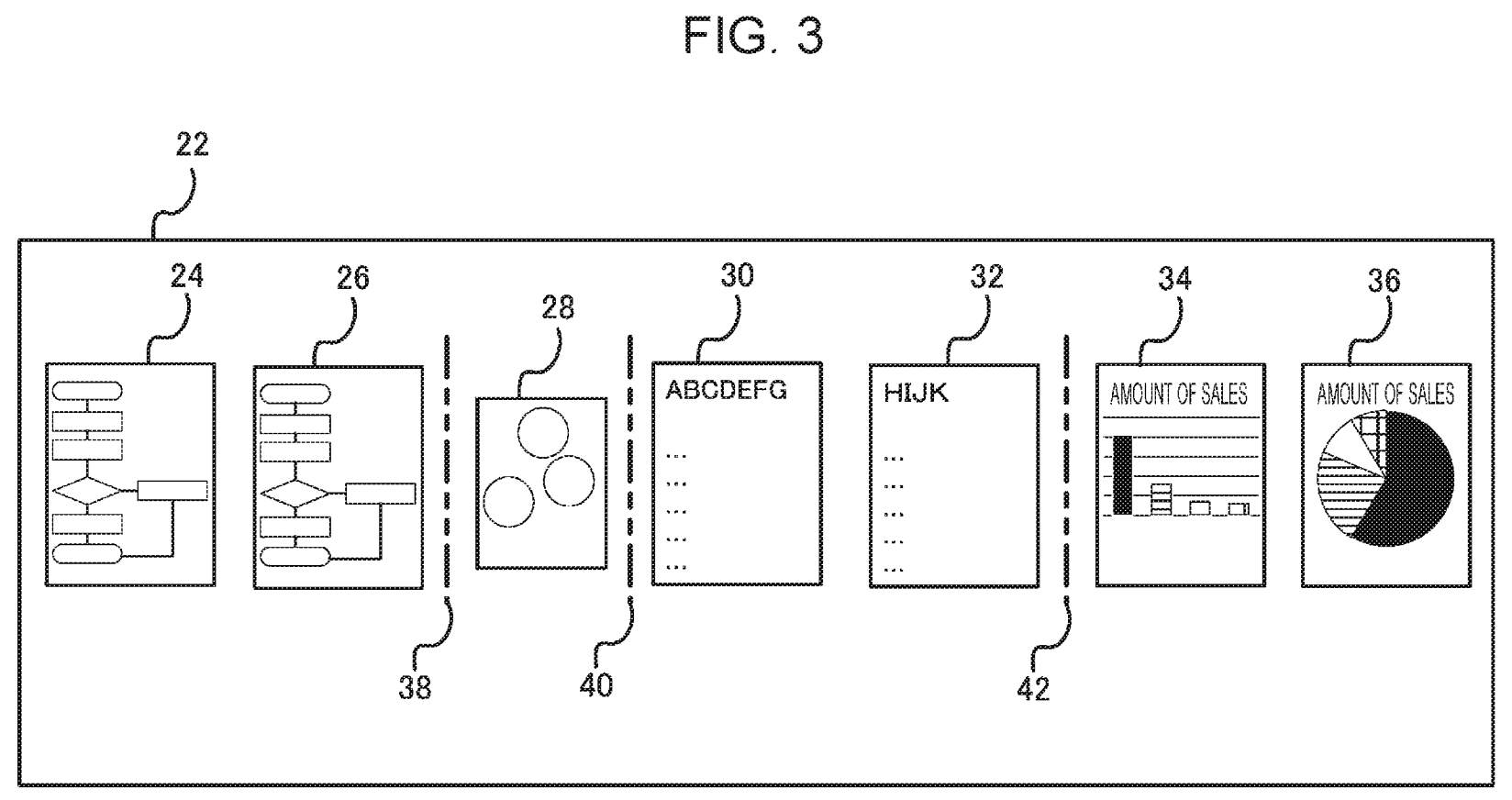

FIG. 3 illustrates an example of the image data. Image data 22 in FIG. 3 includes multiple pages (for example, pages 24, 26, . . . , and 36) displayed in a side-by-side fashion. Multiple documents include multiple pages.

For example, the image acquisition apparatus 12 may now scan all documents in batch, creating the image data 22. Specifically, each of the documents includes one or more pages and the image acquisition apparatus 12 scans successively the documents, creating the image data 22 displayed in a side-by-side fashion. The pages forming a document are scanned in the order of pages. The order of arrangement of the pages of the image data 22 corresponds to the order of scanning. More in detail, one or more pages forming a document (for example, document 1) are sequentially scanned by the image acquisition apparatus 12 and one or more pages forming another document (for example, document 2) are sequentially scanned by the image acquisition apparatus 12. The thus obtained image data 22 includes the document 1 including one or more pages and the document 2 including one or more pages displayed in a side-by-side fashion. The order of arrangement of the pages is the order of scanning of the pages.

Referring to FIG. 3, one document (for example, document 1) includes pages 24 and 26, another document (for example, document 2) includes page 28, another document (for example, document 3) includes pages 30 and 32, and another document (document 4) includes pages 34 and 36.

The image acquisition apparatus 12 scans in batch the pages forming each document in the order of documents 1, 2, 3, and 4. As a result, the pages are arranged in the order of pages 24, 26, 28, 30, 32, 34, and 36 in the image data 22. Specifically, the image acquisition apparatus 12 scans the pages in the order of pages 24, 26, 28, 30, 32, 34, and 36, thereby creating the image data 22.

For convenience of explanation, virtual lines are drawn between the documents. A virtual line 38 is drawn between the document 1 and document 2. A virtual line 40 is drawn between the document 2 and document 3. A virtual line 42 is drawn between the document 3 and document 4. The location where each virtual line is drawn corresponds to the segmentation position of each document.

The segmentation position is located where a document represented by the image data is segmented from another document adjacent to the first document in the image data. More in detail, each document includes a top page and a final page. If a document includes multiple pages, the top page and final page are different pages. If a document includes only one page, the page is the top page and at the same time the final page. For example, the segmentation position corresponds to the location between the top page of a document represented by the image data and a page immediately prior to the top page (specifically, a page scanned prior to the top page, in other words, a page corresponding to the final page of another document represented by the image data). Moreover, the segmentation position corresponds to a location between the final page of a document and a page subsequent to that final page (specifically, a page scanned immediately subsequent to the final page, in other words, a page corresponding to the top page of another document).

Referring to FIG. 3, the page 26 is the final page of the document 1 and the page 28 is the top page of the document 2. Concerning the page 28 serving as the top page, the location between the page 26 immediately prior to the page 28 (specifically, the page scanned immediately prior to the page 28) and the page 28 corresponds to the segmentation position between the document 1 and the document 2. Concerning the page 26 serving as the final page, the location between the page 28 immediately subsequent to the page 26 (specifically, the page scanned subsequent to the page 26) and the page 26 corresponds to the segmentation position between the document 1 and document 2. The same is true of the other documents.

The segmentation position of the documents is identified, for example, by artificial intelligence (AI). The certainty factor of the identification results is calculated. For example, the segmentation position of the documents may be identified by an operation based on machine learning or a rule-based operation. The certainty factor of the identification results is also calculated. The exemplary embodiment is not limited to any particular machine learning. For example, Neural Network, such as Deep Learning, or Reinforcement Learning, may be employed. Convolutional Neural Network (CNN), Recurrent Neural Network (RNN), Generative Adversarial Networks (GAN), Random Forest, or other algorithms may be employed. The operation to identify the segmentation position is described below in greater detail below.

The certainty factor is a statistical measure that indicates how accurate prediction or outputting is. According to the exemplary embodiment, the certainty factor is the certainty factor of the segmentation position.

Figure 4:
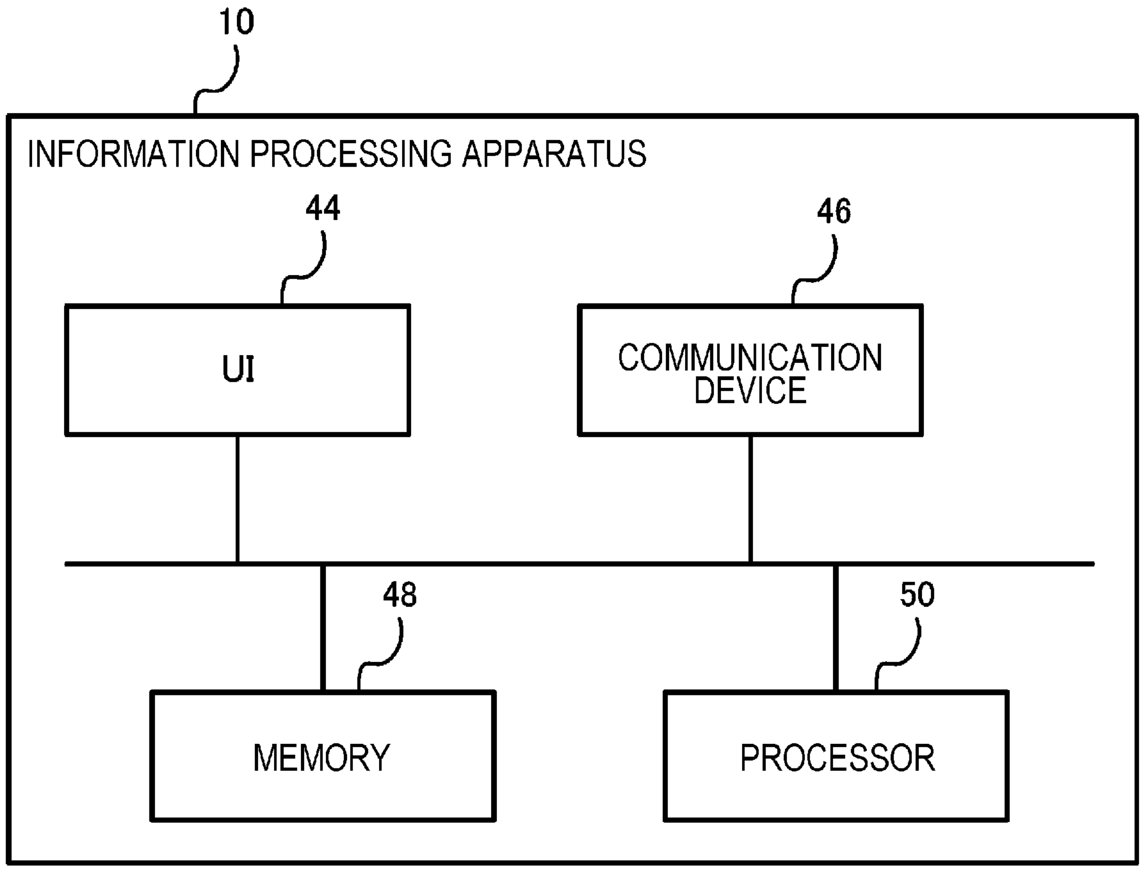
FIG. 4 is a block diagram illustrating a hardware configuration of an information processing apparatus.

FIG. 4 is a block diagram illustrating the hardware configuration of the information processing apparatus 10 of the exemplary embodiment. The information processing apparatus 10 includes a user interface (UI) 44, communication device 46, memory 48, and processor 50.

The UI 44 incudes a display and input device. The display may be a liquid-crystal display or electroluminescence (EL) display. The input device may a keyboard, mouse, input keys and/or operation panel. The UI 44 may be UI, such as a touch panel, serving as the display and the input device at the same time.

The communication device 46 includes one or more communication interfaces, each including a communication chip and a communication circuit. The communication device 46 has a function of transmitting information to another apparatus and a function of receiving information from the other apparatus. The communication device 46 may have near field communication, such as a short-range wireless communication function or Wi-Fi (registered trademark), or a wired communication function.

The memory 48 has one or more memory regions storing data. The memory 48 may be a hard disk drive (HDD), solid-state drive (SSD), one of a variety of memories (including random-access memory, dynamic RAM (DRAM), non-volatile RAM (NVRAM), and read-only memory (ROM)), one of other memories (such as an optical disk), or a combination thereof.

The processor 50 controls the operation of each element of the information processing apparatus 10. The processor 50 is an example of a second processor.

The processor 50 receives the image data representing multiple documents from the image acquisition apparatus 12 via the communication device 46. The processor 50 performs on the image data the operation to identify the segmentation position of the documents. As described above, the operation to identify the segmentation position of the documents may be performed by an apparatus other than the information processing apparatus 10. According to the exemplary embodiment, however, the processor 50 performs the operation to identify the segmentation position.

The operation to identify the segmentation position is described below. The processor 50 extracts a feature of each page forming multiple documents included in the received image data. The term "feature" refers to information acquired from the image data. For example, the feature refers to a character string, drawings, and tables displayed on a page, size of the page, color of the page, orientation of each character, size of each character, and color of each character. The processor 50 extracts, on a per page basis, a difference between the feature of one page and the feature of a neighboring page adjacent to the one page, and identifies the segmentation position in accordance with the difference. The term "difference" refers to a difference that appears when any specific adjacent pages are compared with each other. According to the exemplary embodiment, the feature and the difference of the pages are used to identify the top page and final page forming a document.

In machine learning, the relationship between the difference and the segmentation position of the documents is learned. Using machine learning, the processor 50 identifies the segmentation position in accordance with the extracted difference and calculates the certainty factor of the segmentation position. In another example, a rule representing the relationship between the difference and the segmentation position is defined and the processor 50 may identify the segmentation position in accordance with the extracted rule.

The processor 50 identifies the top page of each document in accordance with the difference and identifies as the segmentation position the location between the top page and the immediately prior page. Since multiple pages are displayed side by side in the image data, the location between the top page and the page immediately prior to the top page is estimated to be the segmentation position of the documents. The processor 50 thus identifies the location between the top page and the page immediately prior to the top page to be the segmentation position of the documents. For example, in machine learning, the relationship between the difference and the top page is learned. The processor 50 uses machine learning, thereby identifying the top page in accordance with the extracted difference and identifying the segmentation position. The top page may be identified in accordance with the rule-based operation.

In another example, the processor 50 may identify the final page of each document in accordance with the difference and identify the location between the final page and the page immediately subsequent to the final page to be the segmentation position. The location between the final page and the page immediately subsequent to the final page may be estimated to be the segmentation position. For example, in machine learning, the relationship between the difference and the final page is learned. The processor 50 uses machine learning, thereby identifying the final page in accordance with the extracted difference and identifying the segmentation position. The final page may be identified in accordance with the rule-based operation.

The processor 50 may identify the top page and the final page and identify the segmentation position in accordance with the identification results. Specifically, the processor 50 may identify the segmentation position by identifying only the top page, by identifying only the final page, or by identifying both the top page and final page.

The processor 50 causes the display to display the segmentation position with the display format responsive to the specific certainty factor of the segmentation position. For example, the processor 50 causes the display to display multiple pages represented by the image data, thereby displaying the segmentation position on the display. The pages forming each document are scanned in the order of pages, and the image data is thus created. The processor 50 causes the display to display the pages arranged in a side-by-side fashion in the order of scanning, thereby displaying the segmentation position on the display. The processor 50 then changes the display format in response to the certainty factor of the segmentation position. The processor 50 may cause the display of the information processing apparatus 10 to display the multiple pages or may cause the display of the terminal apparatus 14 to display the multiple pages. If the pages are displayed on the display of the terminal apparatus 14, the processor 50 transmits to the terminal apparatus 14 information indicating the display format responsive to the certainty factor of the segmentation position. The terminal apparatus 14 receives the information and causes the display to display the pages in the display format responsive to the certainty factor of the segmentation position.

Display format management information indicating association between the certainty factor of the segmentation position and the display format is pre-stored on the memory 48. The processor 50 identifies the display format responsive to the certainty factor of the segmentation position by referencing the display format management information stored on the memory 48, and causes the display to display the segmentation position in accordance with the identified display format.

The term "display format" refers to the way how the segmentation position is displayed. Examples of the display format are color, shape, size, and position.

The processor 50 causes the display to display the pages represented by the image data and thus displays the segmentation position in the display format responsive to the certainty factor of the segmentation position between one page and another page adjacent to the one page.

For example, the processor 50 displays an image (such as an icon or mark) representing the segmentation position at the segmentation position and changes the display format of the image in response to the certainty factor of the segmentation position. Specifically, the processor 50 changes the color and shape of the image in response to the certainty factor of the segmentation position.

In another example, the processor 50 may change, in response to the certainty factor of the segmentation position, a distance between two pages adjacent to each other across the segmentation position or an arrangement relationship between the two pages. For example, the processor 50 causes the display to display each page with a distance between the two pages longer (the distance between the two pages set to be longer) as the certainty factor is higher. Depending on user setting, the processor 50 may cause the display to display each page with the distance between the two pages shorter as the certainty factor is higher.

In yet another example, the processor 50 may cause the display to display, in a bundle of document, one or more pages interposed between two segmentation positions having the certainty factor equal to or higher than a threshold.

Referring to FIG. 5, the feature of each page is described below. FIG. 5 illustrates the feature of each page and a difference between feature values of the pages. The feature value of the page is an example of a measure of each page.

The features of the pages are defined herein as a feature related to a page structure and a feature related to meanings of a character string described on each page. For example, the features related to the page structure includes a feature related to the appearance of each page and a feature related to the appearance of a text written on each page. For example, the features related to the appearance of each page include the size of a paper sheet forming the page and the feature of a drawing written on each page. The vertical length and horizontal width of the paper sheet, the number of lines forming the drawing, the size of the drawing, and the color of the drawing are extracted as the features of the appearance of the page. Paragraphs forming the text and the font size of characters used in the text and the type of characters are defined as the features related to the appearance of the text written on the page. The number of paragraphs, the maximum size of the paragraphs, the number of lower-case letters, the ratio of lower-case letters, the number of Roman numerals, the number of hiraganas (Japanese characters) are extracted as the features of the appearance of the text written on the page. Texts, tables, and drawings are defined as the feature related to the meaning of the character string written on the page. Words and sentences forming the text are defined as the feature related to the text. For example, a keyword related to a word used in a given text is extracted as the feature related to the meaning of the character string written on the page.

The "difference from the prior page" in FIG. 5 refers to a difference between the feature value extracted from a given page (for example, "page B") and the feature value extracted from the page (for example, "page A") immediately prior to the page B. The page A is a page that is scanned immediately prior to the page B. The "difference from the subsequent page" in FIG. 5 refers to a difference between the feature value extracted from a given page (for example, "page B") and the feature value extracted from the page (for example, "page C") immediately subsequent to the page B. The page C is a page that is scanned immediately subsequent to the page B.

In machine learning, the difference in the feature value is learned and the segmentation position is identified in accordance with the difference in the feature value. The "feature value" is a variable that serves as a clue to prediction in finding a general pattern (for example, the feature) in a large amount of data. According to the exemplary embodiment, the "feature value" refers to a variable serving as a clue in prediction in finding the top page and the final page. Referring to FIG. 5, "length," "width," . . . , "language model" are listed as the features in the third column of the table from the right side. The feature value is a numerical value that quantitatively represents the feature.

Specific numerical values are not listed in FIG. 5. For example, a difference between the size of a paper sheet forming a specific page (for example, a vertical length×a horizontal width) and the size of a paper sheet forming the prior page (for example, a vertical length×a horizontal width) may now be 100, and a difference between the size of a paper sheet forming a specific page (for example, a vertical length×a horizontal width) and the size of a paper sheet forming the subsequent page (for example, a vertical length×a horizontal width) may now be 150. In this case, if a larger difference is determined to indicate a higher possibility of another document, a difference of 150 is more likely to be a segmentation position than a difference of 100. Specifically, concerning the specific page, the segmentation position is more likely to be interposed between the specific page and the subsequent page than between the prior page and the specific page.

Figure 6:
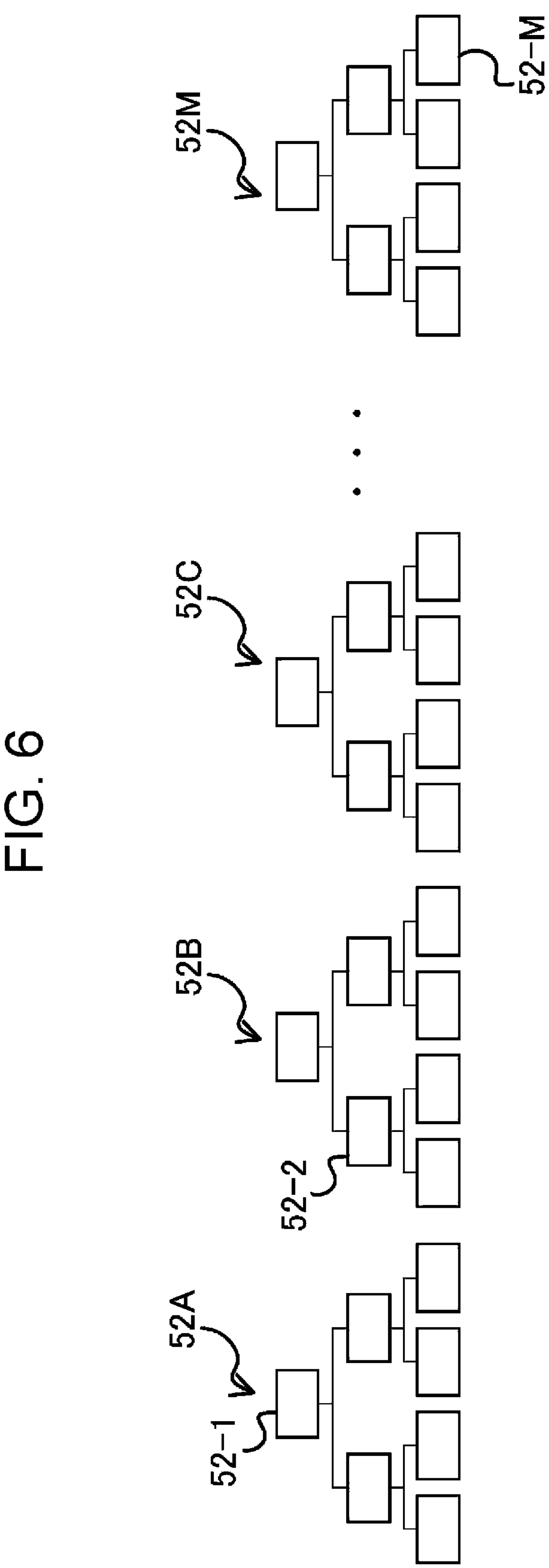
FIG. 6 illustrates an example of a sorter that performs an operation to identify a segmentation position.
Figure 7:
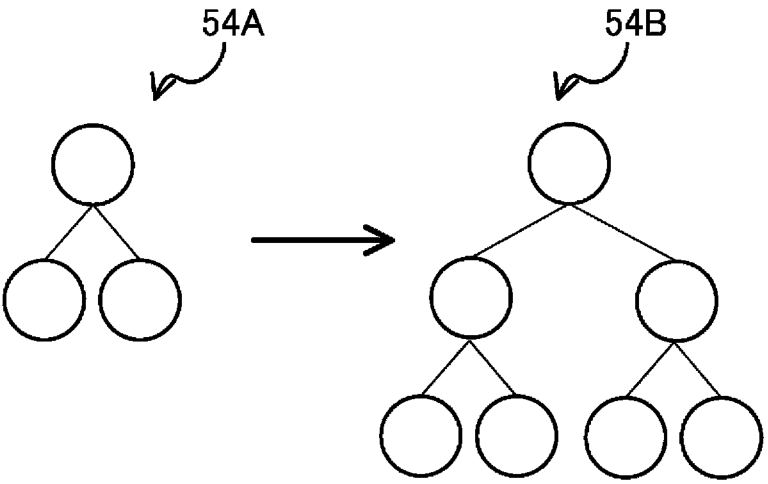
FIG. 7 illustrates another example of the sorter.
Figure 8:
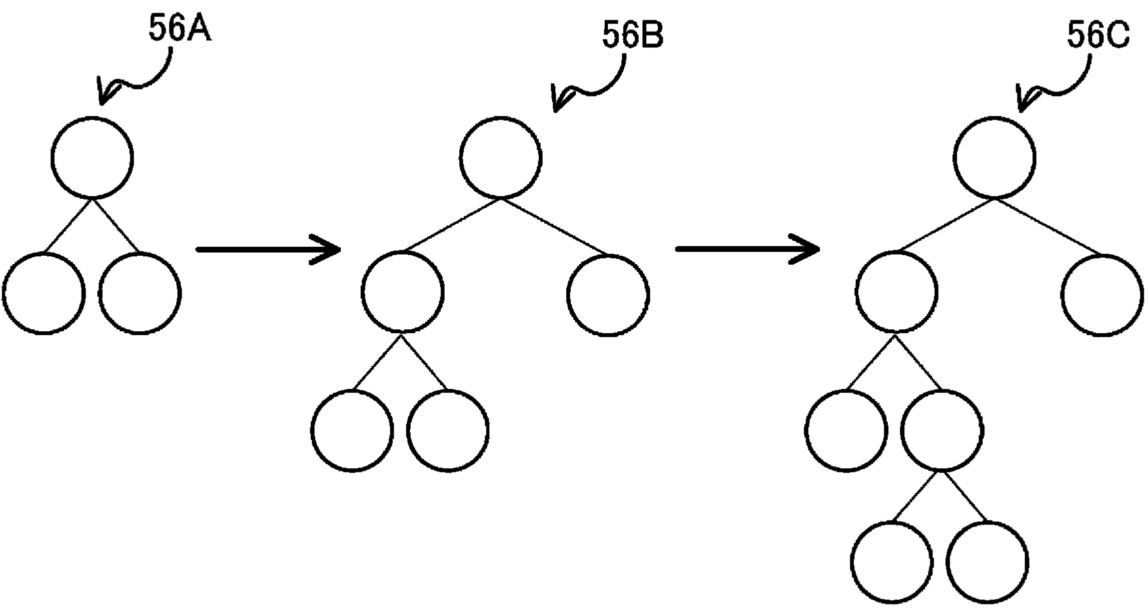
FIG. 8 illustrates another example of the sorter.

An example of the algorithm used in machine learning is described with reference to FIGS. 6 through 8. FIGS. 6 through 8 described examples of sorters.

FIGS. 6 through 8 illustrate another operation to identify the segmentation position using machine learning. Specifically, FIGS. 6 through 8 illustrate examples of sorters. FIG. 6 illustrates decision trees 52A, 52B, 52C, . . . , and 52M as one of machine learning algorithms. The decision tree is a technique of segmenting and sorting groups according to conditional branch using a tree structure. Specifically, if a branch is traced according to a given condition (specifically, a determination is made by yes or no), final results or conclusion are prepared at the end of the branch. For example, referring to FIG. 6, a condition is set at node 52-1 as a root node and if a yes path is followed, processing proceeds to node 52-2. When a leaf node 52-M is reached, results or conclusion is obtained. According to the exemplary embodiment, if a branch is traced according to a condition until a specific condition is satisfied (in other words, all-yes path is followed), a corresponding page is identified as a top page. A location between a page identified as the top page and a page prior to the top page is identified as the segmentation position. To identify another segmentation position in accordance with the exemplary embodiment, a branch is traced according to a condition and a leaf node finally reached may be attached with a specific numerical value as the certainty factor.

FIGS. 7 and 8 illustrate a model that uses decision trees. The model in FIG. 7 is referred to as XGBoost. XGBoost implements higher accuracy by learning multiple decision trees in combination. The model in FIG. 8 is referred to as LightGBM. In the decision trees 54A and 54B in FIG. 7, all leaf nodes have the same depth from the root node. On the other hand, in decision trees 56A, 56B, and 56C in FIG. 8, only a node of necessity creates another node. Specifically, LightGBM is smaller in amount of calculation than XGBoost, and is thus higher in processing speed than XGBoost. Since the sorters in FIGS. 6 through 8, though not described in detail here, are different in terms of final results and in terms of a manner of how the conclusion is extracted, the sorters may be appropriately selected depending on the processing speed and accuracy.

FIG. 9 illustrates a table that associates the certainty factor of the segmentation position and the display format. The table is an example of the display format management information and stored on the memory 48.

Color is used as an example of the display format. Specifically, referring to FIG. 9, the table associates the certainty factor with color. The levels of the certainty factor are "high," "medium," and "low." For example, the certainty factor with a probability of the segmentation position of 80 to 100% is high ("high" in FIG. 9). The certainty factor with a probability of the segmentation position of 40 to 79% is medium ("medium" in FIG. 9). The certainty factor with a probability of the segmentation position of 0 to 39% is low ("low" in FIG. 9). The sorting method herein is described for exemplary purposes only. The certainty factor may be ranked according to a larger number of levels or a smaller number of levels (for example, according to two levels).

Referring to FIG. 9, the high certainty factor corresponds to blue. The medium certainty factor corresponds to light-blue, and the low certainty factor corresponds to white.

The processor 50 references the table and displays on the display the segmentation position at a color corresponding to the certainty factor of the segmentation position. Specifically, the processor 50 references the table and causes the display to display the segmentation position by coloring the segmentation position with the color corresponding to the certainty factor of the segmentation position.

If the certainty factor of the segmentation position is "high," the processor 50 causes the display to display the segmentation position in blue. Specifically, the processor 50 causes the display to display an image representing the segmentation position (such as an icon or mark) at the segmentation position between the pages. If the certainty factor of the segmentation position is high, the processor 50 displays the image in blue.

When the segmentation position is displayed on the display, the display format may be other than color. For example, if shape is used as the display format, a table representing the association between the certainty factor of the segmentation position and the shape is created in advance, and data on the table is stored on the memory 48. Specifically, a high certainty factor is associated with a circle, a medium certainty factor is associated with a triangle, and a low certainty factor is associated with a rectangle. For example, if the certainty factor of the segmentation position is high, the processor 50 causes the display to display the drawing of a circle at the segmentation position on the display. The same is true if size is used as the display format.

Multiple types of display formats may be used. For example, the certainty factor of the segmentation position may be denoted by a combination of color and shape.

Figure 10:
FIG. 10 illustrates an example of a presentation form when acquired image data is displayed on a display.

Referring to FIG. 10, the display example of each page represented by the image data is described. FIG. 10 illustrates a screen 58. For example, FIG. 10 illustrates an example of a presentation form used when acquired image data is displayed on the display. The screen 58 may be a screen on the terminal apparatus 14 or a screen on the display of the UI 44 in the information processing apparatus 10. For example, if the image acquisition apparatus 12 is a scanner, the image data representing one or more documents read by the scanner is displayed on the screen 58.

The screen 58 includes regions 60 and 62. The region 60 displays an image representing one or more pages read by the scanner. For example, 8 pages, namely, pages 1 through 8, are scanned and are displayed in a side-by-side fashion. The region 62 displays in a bundle the same 8 pages, pages 1 through 8 displayed in the region 60. The presentation format that displays the pages in a side-by-side fashion is referred to as a "list view." The presentation format that displays the pages in a bundle is referred to as a "bundle view." The pages forming the bundle view are pages forming one or more documents. The pages forming a document is not necessarily displayed in a bundle view. The pages originally forming different documents may be displayed in a bundle view on the display.

The display format of the segmentation position displayed on the display of the information processing system of the exemplary embodiment is described with reference to FIGS. 11 through 17. FIGS. 11 through 17 illustrate screens, each including multiple pages displayed. The screens are displayed on the display by the processor 50.

Figure 11:
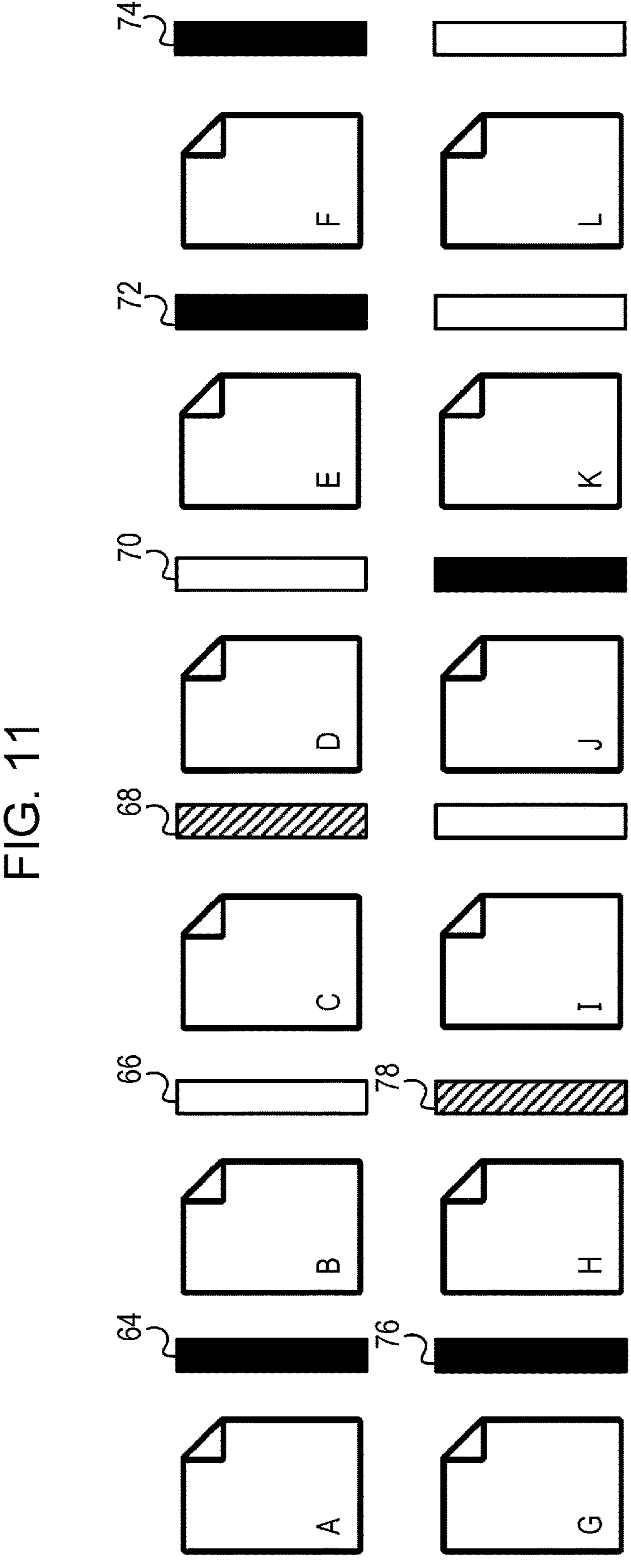
FIG. 11 illustrates an example of a display format that is displayed on a display of an information processing system of the exemplary embodiment.

FIG. 11 illustrates multiple pages that are displayed in the same way as multiple pages are displayed in the region 60 on the screen 58 in FIG. 10. Specifically, FIG. 11 illustrates 12 pages including pages A, B, . . . , and L displayed in a side-by-side fashion. Pages A, B, . . . , and L are elements forming one or more documents, and are scanned by the image acquisition apparatus 12 in the alphabetical order from A through L. The arrangement order of the pages displayed corresponds to the order of scanning. In the following discussion, the same is true of FIGS. 12 through 17. Namely, the arrangement order of the pages displayed on the display corresponds to the order of pages according to which the image acquisition apparatus 12 scans the pages. Specifically, with reference to FIGS. 11 through 17, page A is followed by page B, page B is followed by page C, and so on. The scanned pages are thus displayed in a side-by-side fashion from the left top corner.

FIG. 11 illustrates the state after the processor 50 has performed the operation to identify the segmentation position. The processor 50 causes the display to display the segmentation position in a color responsive to the certainty factor of the segmentation position. As described below, pages forming documents 1, 2, 3, . . . are sequentially scanned by the image acquisition apparatus 12. The processor 50 performs the operation to identify the segmentation position that segments the scanned documents by a unit of document. The operation reveals that the page A is the final page of a document (for example, "document 1"), and that the page B is the top page of the document (for example, "document 2") subsequent to the document 1. The certainty factor thus calculated falls within a range of from 80 to 100%. The processor 50 thus displays a blue segmentation line 64 between the page A and page B. Segmentation lines 64 through 78 in FIG. 11 have rectangular shapes that are arranged, representing the segmentation positions between pages. Since the segmentation lines 72, 74, and 76 have higher certainty factors as the segmentation positions, the processor 50 displays the segmentation lines 72, 74, and 76 in blue in the same way as the segmentation line 64 is.

The processor 50 determines that the probability that the page B prior to the segmentation line 66 and the page C subsequent the segmentation line 66 are in different documents is lower. Specifically, the processor 50 recognizes that the page B and the page C form one document (specifically, the document 2). The certainty factor calculated herein falls within a range of from 0 to 39%. The processor 50 thus displays the white segmentation line 66 between the page B and the page C. The same is true of the segmentation line 70.

The processor 50 determines that the probability that the page C prior to the segmentation line 68 and the page D subsequent to the segmentation line 68 are of different documents is medium. Specifically, the processor 50 determines that the probability that the page C is the final page of the document 2 with the page D being the top page of a document (for example, document 3) subsequent to the document 2 is medium. In other words, the processor 50 determines that the probability that the page C is not the final page with the page C and the page D forming one document (the document 2) is also medium. The certainty factor thus calculated falls within a range of from 40 to 79%. The processor 50 thus displays a light-blue segmentation line between the page C and page D. The same is true of the segmentation line 78.

As described above, the processor 50 may display the certainty factor of the segmentation position in a display format different from a rectangular shape serving as a segmentation line representing the segmentation position between the pages. For example, the processor 50 may display one or more pages in a document bundle between the segmentation positions having the certainty factor equal to or higher than a threshold. For example, the processor 50 interposes the blue segmentation line 64 having a higher certainty factor serving as the segmentation position between the page A and the page B illustrated in FIG. 11. Specifically, the probability that the page A and the page B form different documents falls within a range of from 80 to 100%. The segmentation line 72 having a higher certainty factor serving as the segmentation position is interposed between the page E and page F in FIG. 11. Specifically, the probability that the page E and page F forming different documents falls within a range of from 80 to 100%. For example, if the threshold is set to 80% or higher, the processor 50 displays one or more pages in a document bundle between the segmentation positions having a certainty factor of 80% or higher. Specifically, pages B, C, D, and E between the blue segmentation lines 64 and 72 are displayed in a bundle. As a result, the pages B through E displayed in a bundle is displayed as a document different from the page A as a prior page and the page F as a subsequent page.

The processor 50 causes the display to display the pages with a distance varied between one page and another page adjacent to the one page. Since the segmentation position is more likely to be present between the page A and the page B with reference to FIG. 11 as described above, the processor 50 may cause the display to display the page A and the page B spaced apart from the page A. Since the segmentation position is less likely to be present between the page B and the page C, the processor 50 may cause the display to display the page B and the page C closer to the page B. According to the exemplary embodiment, as the certainty factor is higher, the pages are displayed on the display with a distance between the pages set to be longer (namely, with the two pages more apart from each other). Conversely, an opposite display format may be used. Specifically, as the certainty factor is higher, the pages are displayed on the display with a distance between the pages set to be shorter (namely, with the two pages less apart from each other).

In one of the applications of the exemplary embodiment, the user may determine whether the segmentation position between the documents is correct. Since the certainty factor is presented as visual information to the user in the display format in FIG. 11, the user may check only pages prior to and subsequent to the segmentation lines 68 and 78 having a medium certainty factor.

Figure 12:
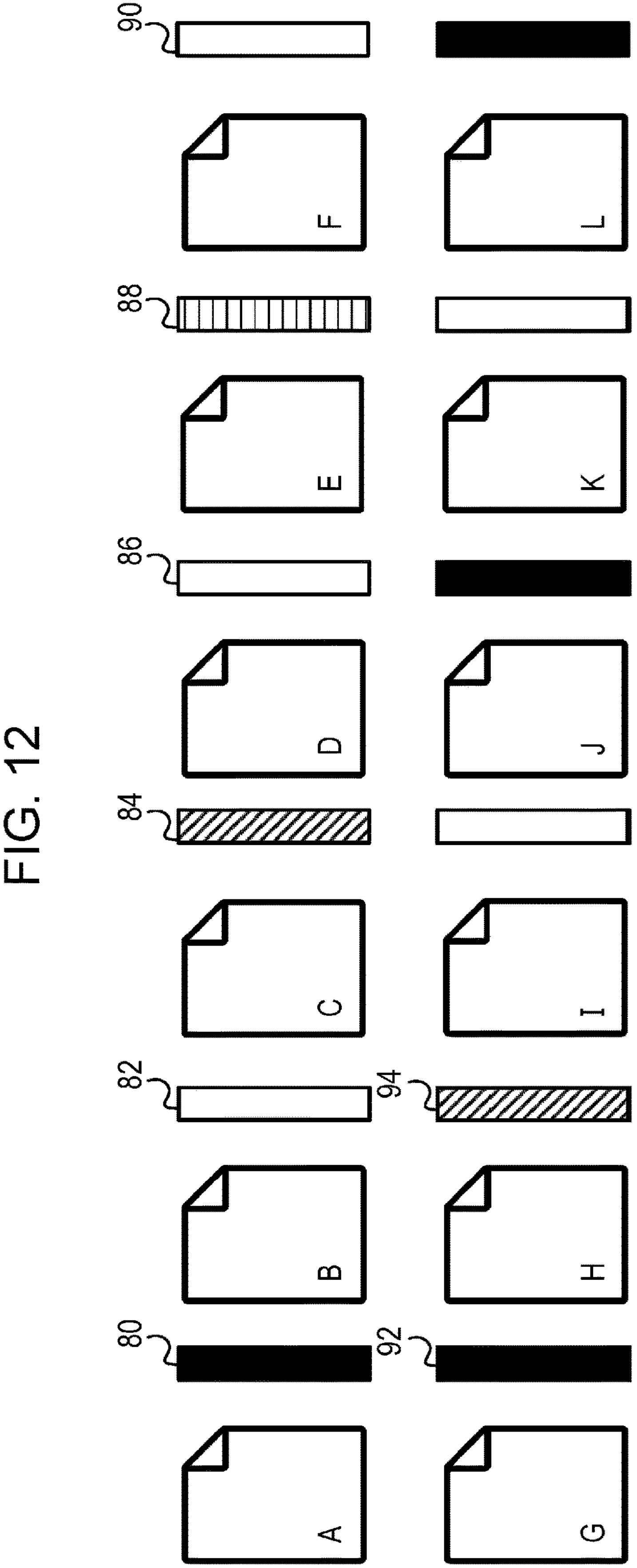
FIG. 12 illustrates another example of the display format.

FIG. 12, which is partially modified from FIG. 11, displays another example of the display format. FIG. 12 and FIG. 11 are identical to each other in that one or more pages including 12 pages A, B, . . . , and L are displayed in the list view but are different from each other in that the display format of the segmentation position is partially different. A segmentation line 88 in FIG. 12, not illustrated in FIG. 9, is a line between the blue light and white (for example, "gray") and lower in the certainty factor of the segmentation position in light-blue. If represented by numerical value, gray has a probability of 25 to 49% as being the segmentation position and light-blue has a probability of 50 to 79% as being the segmentation position. In this case, white has a probability of 0 to 24% as being the segmentation position. Specifically, referring to FIG. 12, the segmentation positions are denoted by four colors responsive to the certainty factor.

Figure 13:
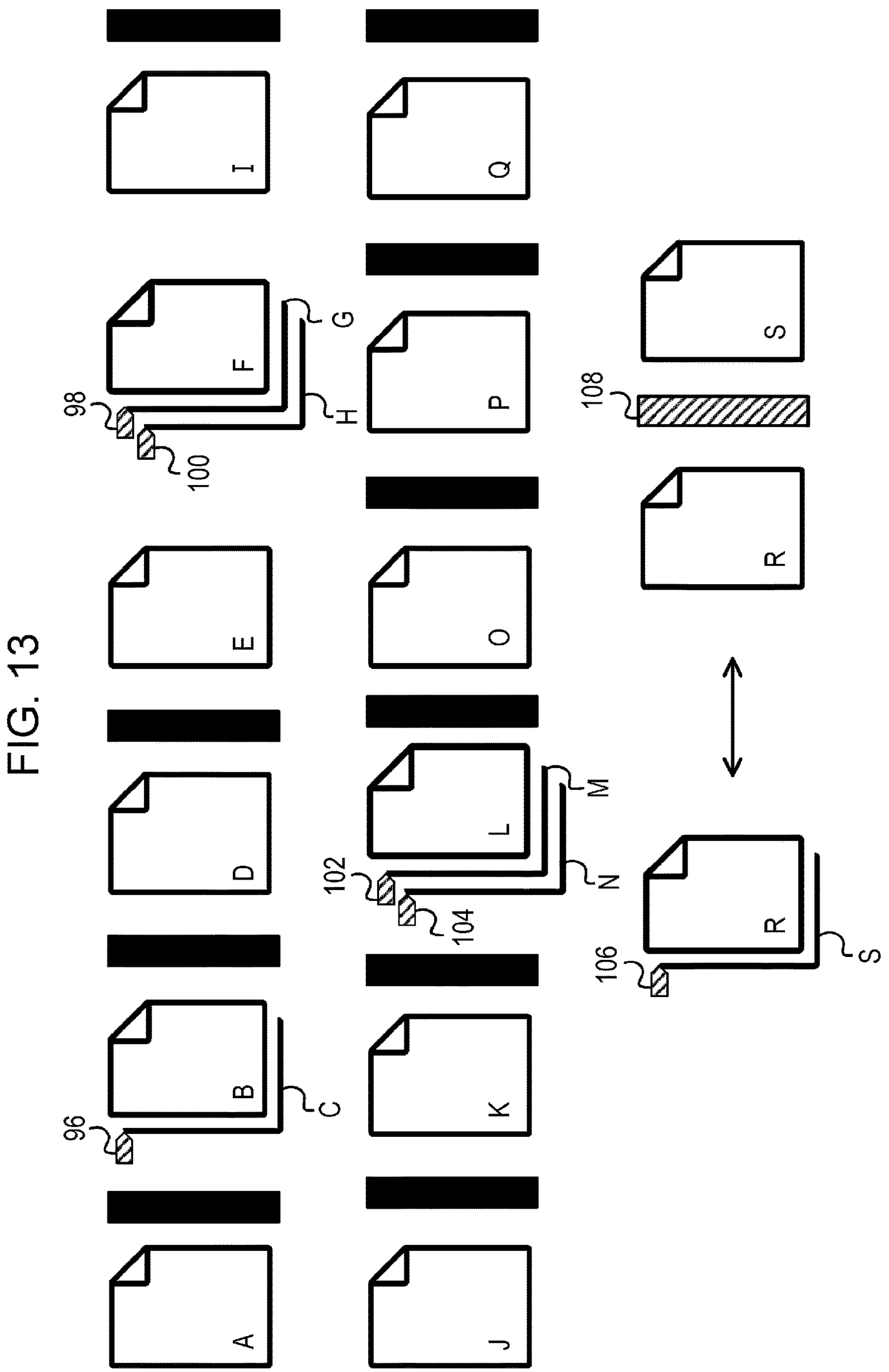
FIG. 13 illustrates another example of the display format.

FIG. 13, which is partially modified from FIG. 11, illustrates another example of the display format. Tags 96, 98, . . . , and 106 are displayed as marks responsive to the certainty factors at the top left corners of pages C, G, H, M, N, and S. The tags are examples of drawings representing the segmentation positions. Referring to FIG. 13, tags are displayed on pages corresponding to the light-blue in FIG. 9, namely, having a medium certainty factor of the segmentation position. The tag serving as a mark is displayed on a page that is subsequent to the segmentation position. The pages B and C are displayed in a bundle but do not necessarily form the same document. The tag displayed on the page C indicates the possibility that the segmentation position is present between the page B and page C. The tag displayed on the page C also indicates that the certainty factor of the segmentation position is medium.

The page R and page S in FIG. 13 are displayed in two presentation forms. On the screen displayed on the display in FIG. 13, the pages R and S on the bottom left corner of the screen are displayed in the bundle view while the pages R and S on the bottom right corner of the screen are displayed in the list view. The user may switch between the presentation forms. Specifically, the processor 50 receives an instruction from the user via the UI 44 and performs an operation to switch one presentation form to another. As a mark of the certainty factor of the segmentation position, the tag 106 is displayed between the pages R and S in the bundle view and the segmentation line 108 is displayed between the pages R and S in the list view, The image forming system of the exemplary embodiment may switch the presentation form of the display between the list view and the bundle view. For example, the user may select a mark by operating a mouse onto a tag and a segmentation line, serving as the mark of the certainty factor, and may thus switch the presentation form of the pages prior to and subsequent to the selected mark. The switching of the presentation form may be performed from either of the bundle view and the list view. If the size of the image data acquired by the image acquisition apparatus 12 is larger, for example, if the number of pages forming one or more documents is higher, the list view may possibly be unable to accommodate the pages on a single screen. In such a case, the presentation form may be switched from the list view to the bundle view. On the other hand, the user may have difficulty visually viewing a difference between the feature of one page and the feature of another page adjacent to the one page. In such a case, the user may switch the presentation form from the bundle view to the list view by operating the mouse onto the tag displayed on the page represented in the bundle view.

The user may provide instructions to perform an operation to correct segmentation and an operation to enter instruction, by operating the mouse in the information processing system of the exemplary embodiment. Specifically, the processor 50 receives the instructions from the user via the UI 44, and performs on the image data displayed on the display the operation to correct segmentation and the operation to enter.

The operation to correct segmentation is performed as described below. For example, if the certainty factor of the segmentation position is higher, the user may double-click or right-click the mark, such as the tag or segmentation line, displayed in blue, thereby modifying the mark to be displayed in white.

The operation to enter is performed as described below. For example, the user may press an "Enter" button to allow the processor 50 to perform an operation to segment data on a per document basis in accordance with the display format then displayed on the screen. The enter button may be an individual enter button or a batch enter button. When the segmentation position is selected one by one using the mouse, the individual enter button is used to perform the operation to identify whether the document is to be segmented at the corresponding segmentation position in accordance with the present display format. The batch enter button, when pressed using the mouse, performs the operation to put together multiple documents into one document at the segmentation position having a certainty factor equal to or higher than a threshold, in accordance with the present display format. Specifically, if the batch enter button is pressed, the pages prior to and subsequent to the segmentation position displayed in blue are sorted as separate documents and the pages prior to and subsequent to the segmentation position displayed in white are sorted as the same document.

In the example described below, the user does not provide the instruction to perform the operation to correct segmentation and presses the batch enter button after checking the screen in FIG. 13. The probability that the document is segmented at the segmentation position displayed in blue falls within a range of from 80 to 100%. If the threshold of the certainty factor is determined to be 80% or higher in advance, the processor 50 performs the operation to segment the pages into the page A and page B. Similarly, the processor 50 performs the operation to segment the pages into the page C and page D, into the page D and page E, and into the page I and page J. The same is true of the page J and subsequent pages. On the other hand, a tag 96 in light-blue is displayed on the page C. Specifically, the probability that the document segmentation is performed between the page B and page C falls within a range of from 40 to 79%. Since the certainty factor that the document segmentation is performed between the page B and page C is less than the predetermined threshold of the certainty factor, the processor 50 does not perform the operation to segment the documents into the page B and page C. Similarly, the processor 50 does not perform the operation to segment the documents into the page E and page I. Once the batch enter button is pressed, the processor 50 puts together the page B and page C as one document and similarly puts together the page E through page I as one document.

The mouse operation of the user is used to trigger the operation to correct the presentation form, the operation to correct segmentation, and the operation to enter. This operation has been described for exemplary purposes only. In order to provide the instruction to switch the presentation form, the user may use a touch panel function of the UI 44 or may operate a device having an input function other than the information processing apparatus 10.

Figure 14:
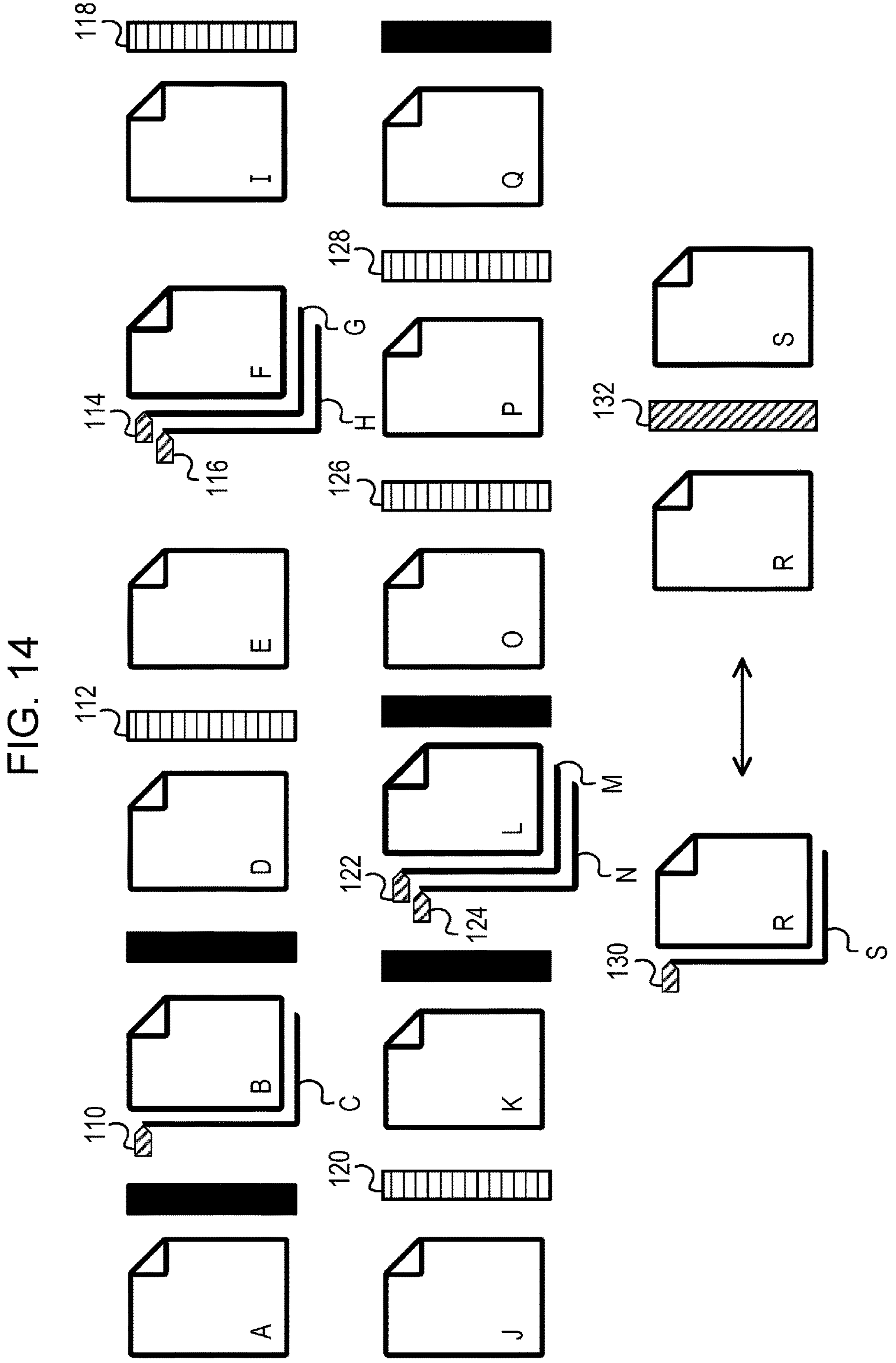
FIG. 14 illustrates another example of the display format.

FIG. 14, which is partially modified from FIG. 13, illustrates another example of the display format. FIG. 14, like FIG. 2, displays the certainty factor of the segmentation position in four colors. Specifically, as illustrated in FIG. 14, light-blue tags 110, 114, 116, 122, 124, and 130 indicating that the certainty factor of the segmentation position is medium are illustrated and gray segmentation lines 112, 118, 120, 126, 128, and 132 indicating the intermediate concept between light-blue and white are illustrated. FIG. 14 is identical to FIG. 13 except that FIG. 14 illustrates gray segmentation lines.

Figure 15:
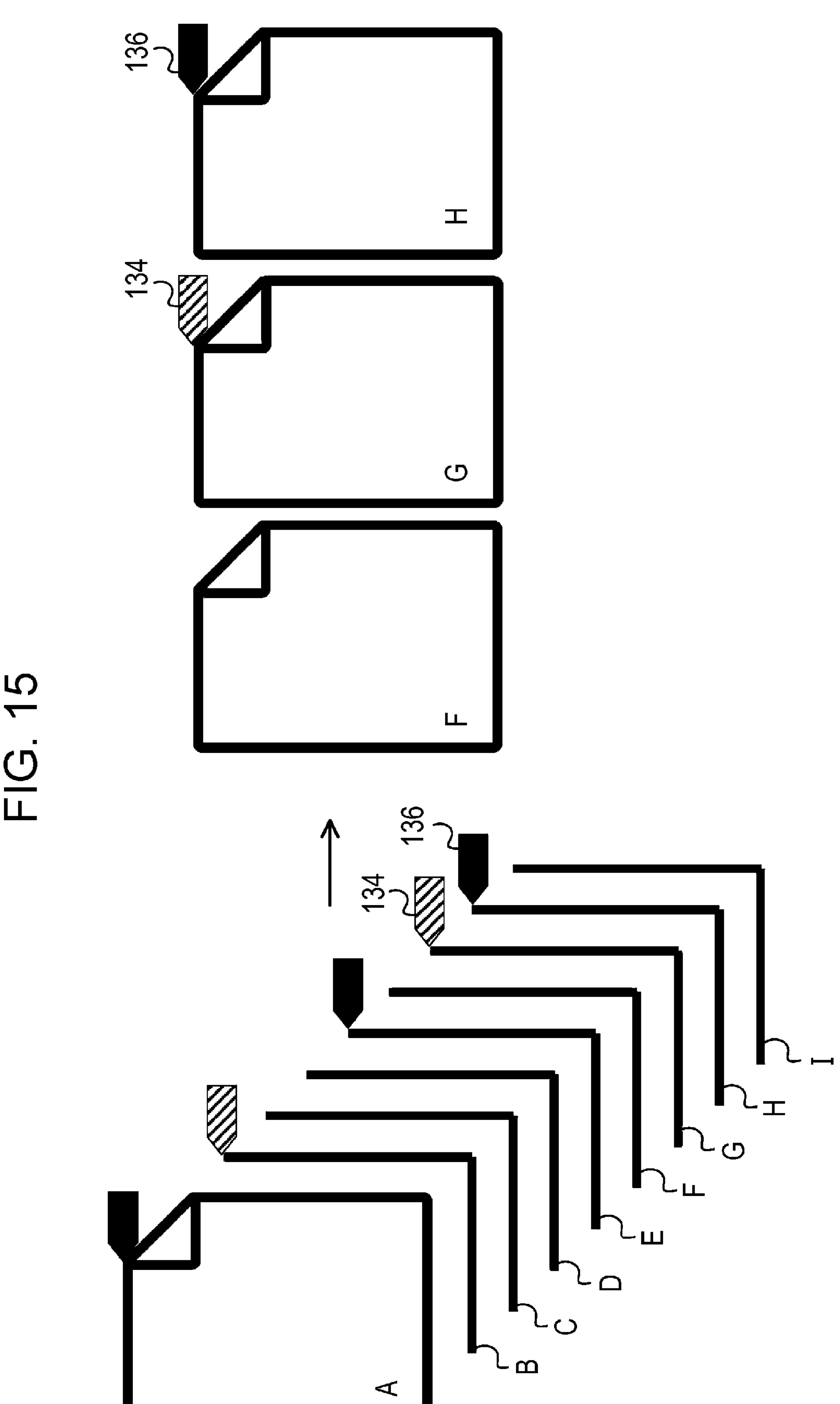
FIG. 15 illustrates another example of the display format.

FIG. 15, which is partially modified from FIG. 11, illustrates another example of the display format. The left-hand side of the screen of the display in FIG. 15 displays 19 pages of pages A, B, . . . , and I in the bundle view. As previously described, the processor 50 may switch between the bundle view and the list view in response to a user operation. The right-hand side of the screen of the display in FIG. 15 partially displays pages F, G, and H that are switched to the list view from the bundle view. Referring to FIG. 15, the processor 50 causes the display to display tags that are attached to the segmentation position having a higher certainty factor and the segmentation position having a medium certainty factor. The operation that a prior page and a subsequent page originally belonging to different documents are bundled as a single document may be more problematic than the operation that a prior page and a subsequent page forming one document are segmented as separate documents. In such a case, with reference to a mark displayed at the segmentation position having a higher certainty factor and a mark at the segmentation position having a medium certainty factor (tags 134 and 136 in FIG. 15), the user may check before pressing the enter button whether the segmentation position between one document and another document is correct.

Figure 16:
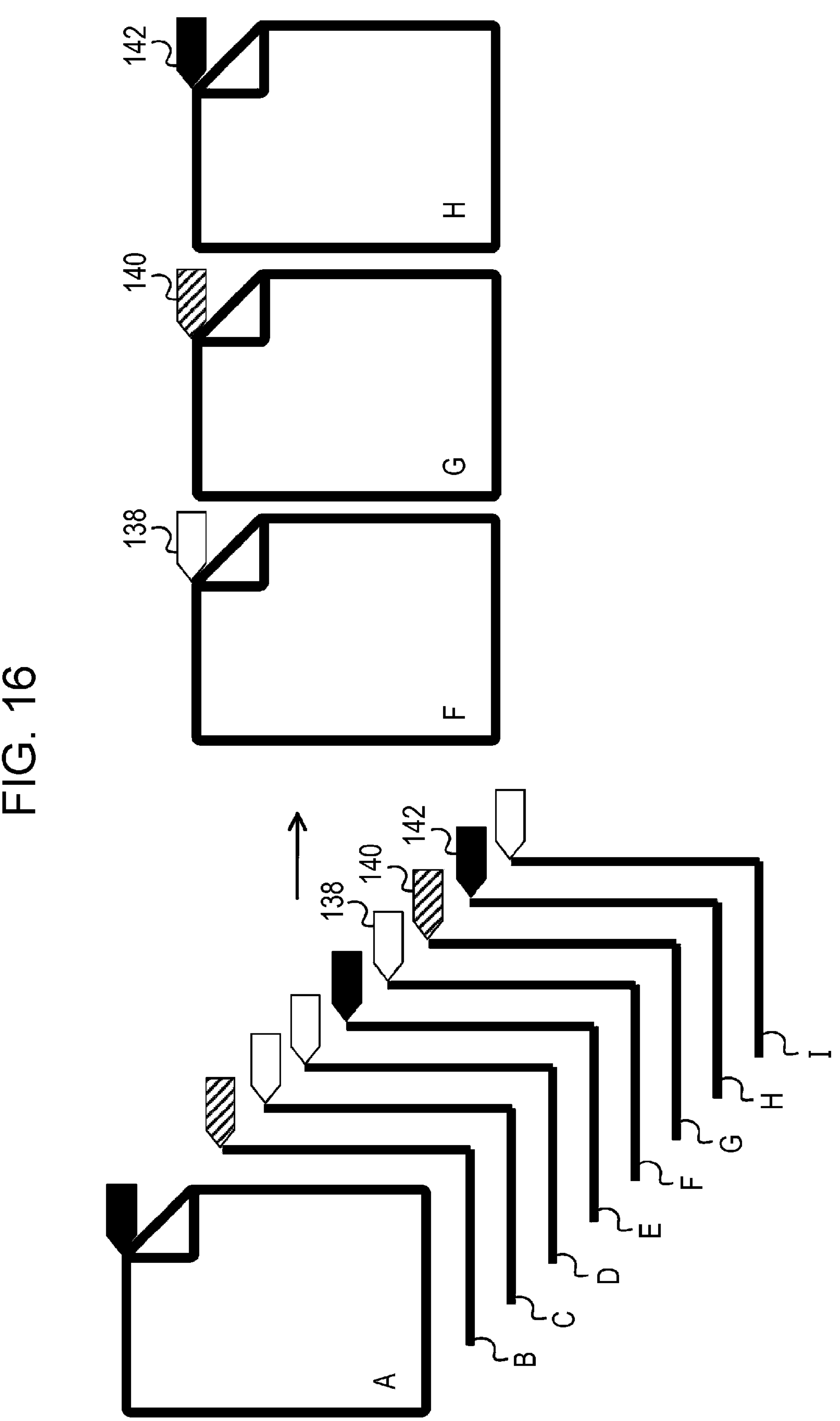
FIG. 16 illustrates another example of the display format.

FIG. 16, which is partially modified from FIG. 15, illustrates an example of the display format. FIG. 16 illustrates a tag 142 at the segmentation position having a higher certainty factor and a tag 140 at the segmentation position having a medium certainty factor. Referring to FIG. 16, a tag 138 is displayed at the segmentation position having a lower certainty factor. FIGS. 15 and 16 are identical to each other except that tags are attached to the segmentation positions having a lower certainty factor in FIG. 16.

Figure 17:
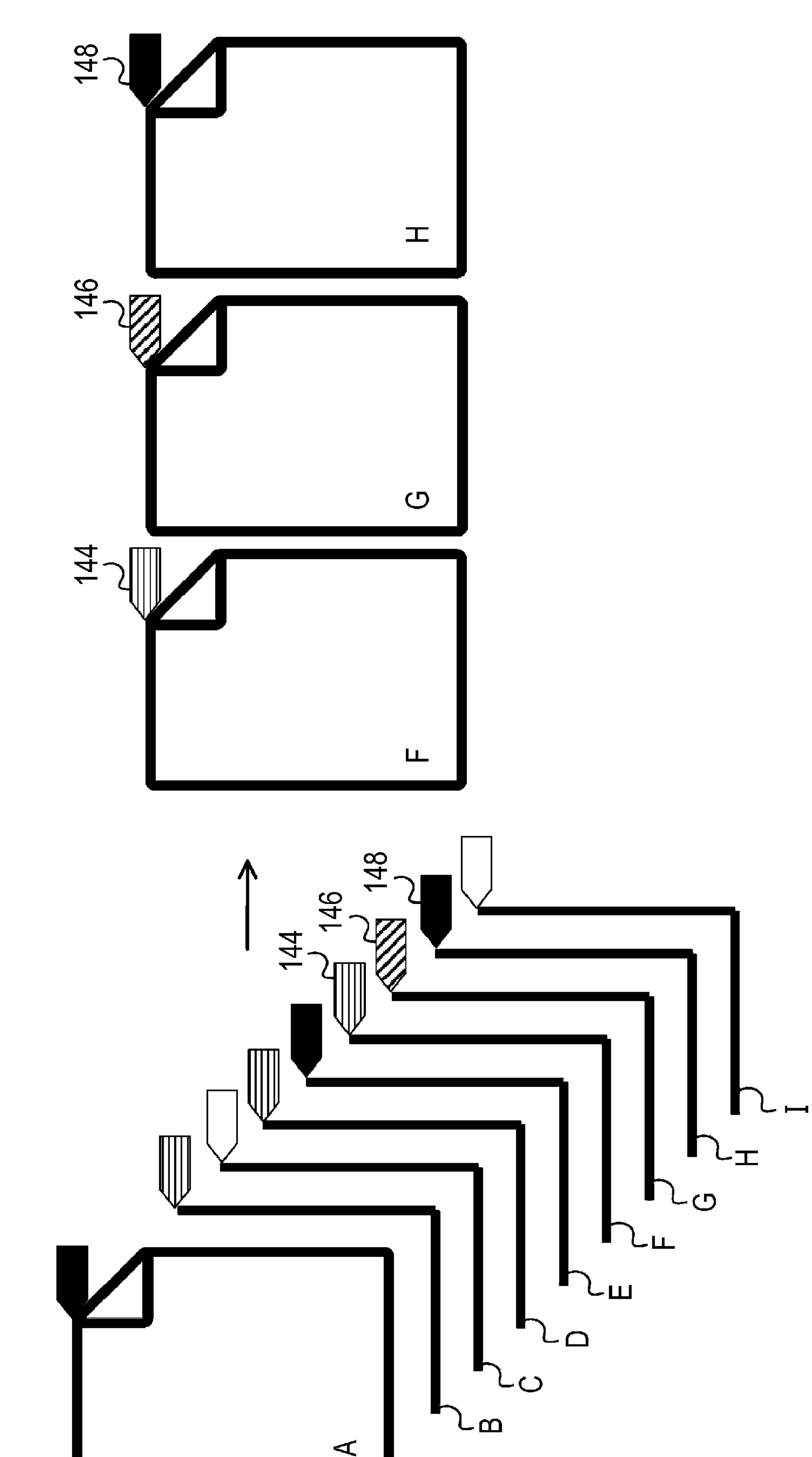
FIG. 17 illustrates another example of the display format.

FIG. 17, which is partially modified from FIG. 15, illustrates another example of the display format. As in FIGS. 12 and 14, the certainty factors of the segmentation positions are displayed in four colors in FIG. 17. Referring to FIG. 17, a tag 148 is displayed at the segmentation position having a higher certainty factor and a tag 146 is displayed at the segmentation position having a medium certainty factor. Referring to FIG. 17, a tag 144 is displayed at the segmentation position having a certainty factor even lower than medium and a white tag is displayed at the segmentation position having a lower certainty factor. FIGS. 15 and 17 are identical to each other except that the four different certainty factors of the segmentation positions are displayed in FIG. 17.

Figure 18:
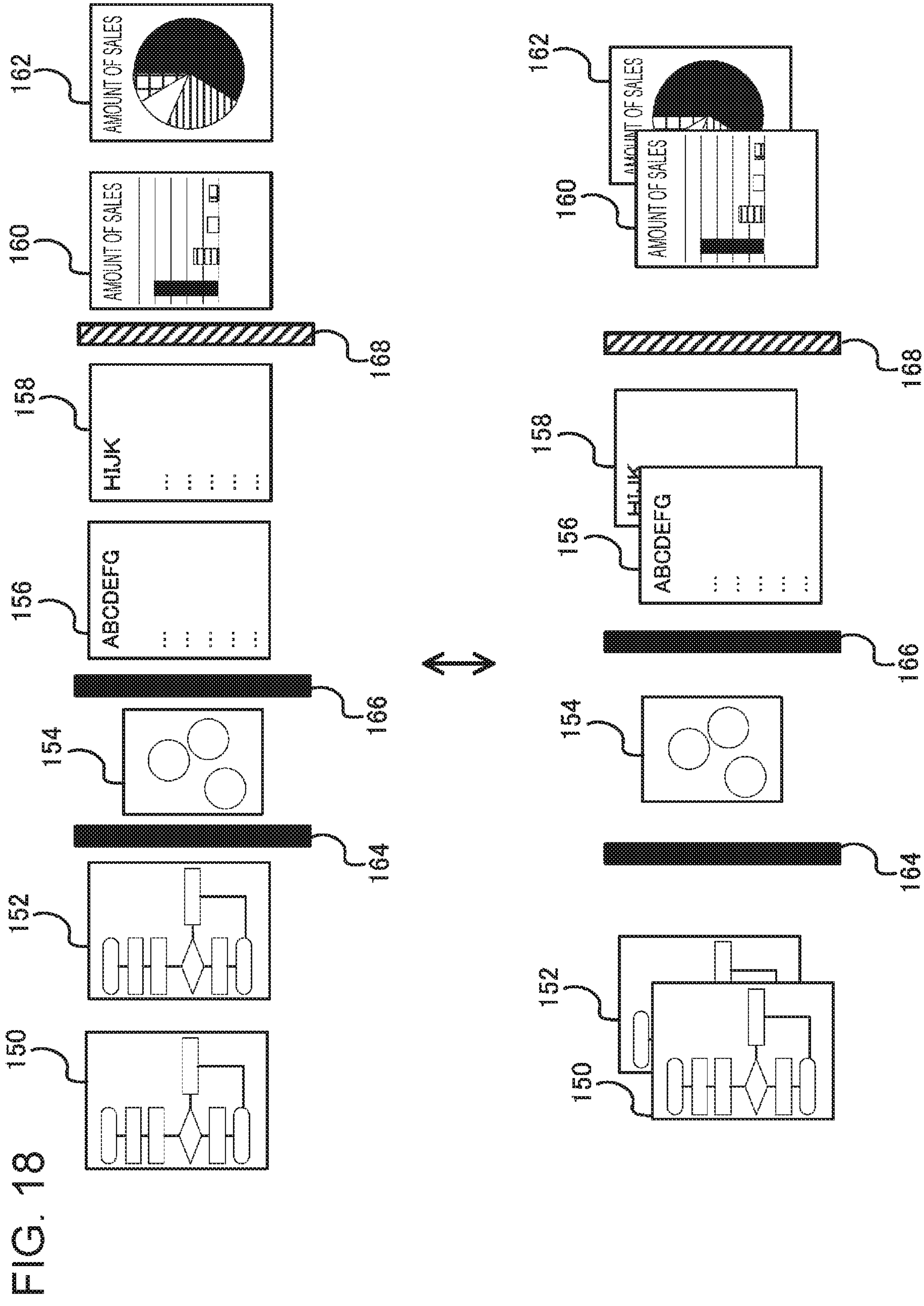
FIG. 18 illustrates an example of a screen that is displayed when an operation of the information processing system of the exemplary embodiment is performed on the image data illustrated in FIG. 3.

FIG. 18 similar to FIG. 11 or other figures illustrates the state of the screen after the processor 50 has performed the operation to identify the segmentation position. Referring to FIG. 18, the screen displays multiple pages in the display format in accordance with the certainty factor of the segmentation position. Since the certainty factor of the segmentation position between page 152 and page 154 is higher in FIG. 18, a blue segmentation line 164 is displayed. Similarly, since the certainty factor of the segmentation position between the page 154 and page 156 is higher, a blue segmentation line 166 is displayed. On the other hand, since the certainty factor of the segmentation position between page 158 and page 160 is medium, a light-blue segmentation line 168 is displayed. In other words, the probability that the page 158 prior to the segmentation line 168 is the final page of a given document (for example, "document 3") is medium. The probability that the page 160 subsequent to the segmentation line 168 belongs to the document 3 is medium and the probability that the page 160 subsequent to the segmentation line 168 is the top page of a document (for example, "document 4") subsequent to the document 3 is medium.

The user may switch the presentation form between the upper side view and the lower side view of the screen of the display in FIG. 18 by operating a mouse or the like. In the lower side view of the screen in FIG. 18, pages 158 and 160 prior to and subsequent to the segmentation line 168 are segmented according to the segmentation position as pages belonging to different documents. However, since the pages 158 and 160 do not necessarily belong to different documents, the light-blue segmentation line 168 is displayed. This indicates the possibility that the pages 158 and 160 are not document segments of the different documents but form the same document.

A series of operations of the processor 50 that controls the elements of the information processing apparatus 10 have been described. Other display formats may be contemplated.

Figure 19:
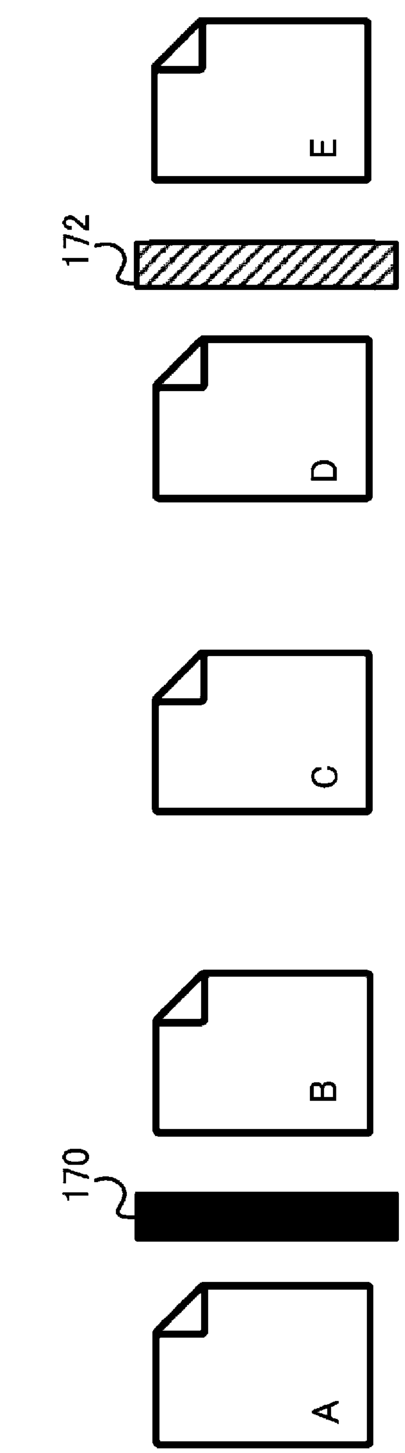
FIG. 19 illustrates another example of the display format.

For example, the processor 50 may cause the display to display the segmentation position in the display format that is different from when the segmentation position is prior to the top page or subsequent to the final page to when the segmentation position is prior to the top page and subsequent to the final page. FIG. 19 illustrates another example of the display format. FIG. 19, similar to FIG. 11 or other figures, illustrates the state of the screen after the processor 50 has performed the operation to identify the segmentation position. FIG. 19 is identical to FIG. 11 or other figures in that the segmentation positions are displayed in different colors depending on the certainty factor of the segmentation position and in that the rectangles as drawings are employed as the segmentation lines representing the segmentation positions between pages.

Documents 1, 2, and 3 may now be scanned in batch by the image acquisition apparatus 12. The processor 50 performs the operation to identify the segmentation position that segments multiple scanned documents according to a document unit. The operation identifies page A to be the final page of a document (for example, "document 1") and page B to be the top page of a document (for example, "document 2") subsequent to the document 1. The operation identifies page D to be the final page of the document 2. On the other hand, the operation may not identify page E to be the top page of a document (for example, "document 3"). In other words, the certainty factor denoted by a segmentation line 170 interposed between the pages A and B has a higher certainty factor (for example, the probability of the segmentation position falls within a range of from 80 to 100%) while the certainty factor denoted by a segmentation line 172 interposed between the pages D and E has a lower certainty factor (for example, the probability of the segmentation position falls within a range of from 40 to 79%) than the segmentation line 170. In such a case, the processor 50 causes the display to display the display format that is different depending on the certainty factors of the segmentation positions, for example, causes the display to display the segmentation line 170 in blue and the segmentation line 172 in light-blue. In the example described herein, the difference in the certainty factor is denoted by color. Alternatively, the difference in the certainty factor may be represented by another display format. For example, if the segmentation position is prior to the top page and subsequent to the final page, a rectangle as a drawing is used as a segmentation line representing the segmentation position. If the segmentation position is prior to the top page or subsequent to the final page, a two-dot chain line may be used as a segmentation line representing the segmentation position. In this way, the certainty factor may be represented by the difference in shape.

According to the exemplary embodiment, the certainty factor of the segmentation position is calculated. A certainty factor having a concept different from the certainty factor of the segmentation position may be used. For example, a certainty factor of continuation of pages may be used. The continuation of the pages refers to whether multiple pages form the same document. For example, as the certainty factor of the continuation of a given page (for example, page A) and a subsequent page (for example, page B) is higher, the possibility that the pages A and B form the same document is higher. In other words, there is a lower possibility that a segmentation position is present between the pages A and B. A position having a higher certainty factor of page continuation leads to a position having a lower possibility of the segmentation position between the final page of a given document and the top page of a subsequent document while a position having a lower certainty factor of page continuation leads to a position having a higher possibility of the segmentation position between the final page of a given document and the top page of a subsequent document. In other words, as the certainty factor of the segmentation position is lower, the certainty factor of page continuation is higher. In accordance with the certainty factor of the page continuation in place of the certainty factor of the segmentation position, the processor 50 may cause the display to display information as to whether one page is continued to the subsequent page. In the same way as the segmentation position is displayed, an image, such as an icon or mark, represents whether one page is continued to the subsequent page. In accordance with the certainty factor of the page continuation, the processor 50 changes the display format of the image, such as the icon or mark (for example, color or shape).

In accordance with the information system of the exemplary embodiment, the user may visually recognize the operation to identify the segmentation position by modifying the display format in response to the certainty factor of the segmentation position.

The functions of the information processing apparatus 10 may be implemented by hardware and software in cooperation. The functions of each apparatus may be implemented by the processor that reads programs stored on the memory on each apparatus and executes the read program. The programs may be loaded to the memories via a recording medium, such as a compact disk (CD) or a digital versatile disk (DVD) or via a communication network.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An information processing apparatus including:

a processor configured to:

perform on image data representing multiple documents an operation that identifies a segmentation position that segments the documents according to a document unit; and cause a display to display identification results in a display format that is responsive to a certainty factor of the identification results.

(((2)))

In the information processing apparatus according to (((1))), the document includes one or more pages, and wherein the processor is configured to:

cause the display to display the pages represented by the image data; and denote, between a page and a neighboring page adjacent to the page, the segmentation position in the display format responsive to the certainty factor of the identification results.

(((3)))

In the information processing apparatus according to one of (((1))) and (((2))), the processor is configured to display one or more pages in a bundle as a document between the segmentation positions having the certainty factor equal to or higher than a threshold.

(((4)))

In the information processing apparatus according to one of (((1))) through (((3))), the processor is configured to, in response to an instruction from a user, switch between a presentation form that causes the display to display the one or more pages in the bundle as the document and a presentation form that causes the display to display, in a side-by-side fashion, the one or more pages forming the document.

(((5)))

In the information processing apparatus according to one of (((1))) through (((4))), the processor is configured to denote the segmentation position by a color or a shape responsive to the certainty factor.

(((6)))

In the information processing apparatus according to one of (((1))) through (((5))), the processor is configured to cause the display to display the pages with a mark responsive to the certainty factor attached on a page subsequent to the segmentation position.

(((7)))

In the information processing apparatus according to (((2))), the processor is configured to cause the display to display the pages with a distance between the page and the neighboring page changed in response to the certainty factor.

(((8)))

In the information processing apparatus according to one of (((1))) through (((7))), the processor is configured to change the display format of the segmentation position in response to an instruction from a user.

(((9)))

In the information processing apparatus according to one of (((1))) through (((8))), the processor is configured to segment the documents at the segmentation position having the certainty factor equal to or higher than a threshold.

(((10)))

In the information processing apparatus according to one of (((1))) through (((9))), the processor is configured to;

extract a feature from each page forming the documents; and on a per page basis, extract a difference between the feature of the page and the feature of the neighboring page; and identify the segmentation position in accordance with the difference.

(((11)))

In the information processing apparatus according to (((10))), the processor is configured to:

identify a top page of the documents in accordance with the difference; and identify as the segmentation position a position between the top page and a prior page prior to the top page.

(((12)))

In the information processing apparatus according to (((10))), the processor is configured to:

identify a final page of the documents in accordance with the difference; and identify as the segmentation position a position between the final page and a subsequent page subsequent to the final page.

(((13)))

In the information processing apparatus according to (((10))), the processor is configured to:

identify a top page and a final page of the documents in accordance with the difference; and identify the segmentation position in accordance with the identification results.

(((14)))

In the information processing apparatus according to (((13))), the processor is configured to cause the display to display the display format of the segmentation position that is different depending on whether the segmentation position is prior to the top page or subsequent to the final page or the segmentation position is prior to the top page and subsequent to the final page.

(((15)))

A program causing a computer to execute a process, the process including:

preforming on image data representing multiple documents an operation that identifies a segmentation position that segments the documents according to a document unit; and causing a display to display identification results in a display format that is responsive to a certainty factor of the identification results.

(((16)))

A system including an image acquisition apparats, an information processing apparatus, and a terminal apparatus, wherein the image acquisition apparatus includes a first processor configured to:

acquire image data representing multiple documents and transmit the image data to the information processing apparatus, wherein the information processing apparatus includes a second processor configured to:

receive the image data representing the documents;

perform on the image data an operation that identifies a segmentation position that segments the documents according to a document unit; and transmit, to the terminal apparatus, information representing a display format responsive to a certainty factor of identification results; and wherein the terminal apparatus includes a third processor configured to:

receive the information and cause a display to display the identification results in a display format responsive to the certainty factor.

What is claimed is:

1. An information processing apparatus comprising:

a processor configured to:

perform, on image data representing a plurality of documents, an operation that identifies a segmentation position that segments the documents according to a document unit; and cause a display to display identification results in a display format that is responsive to a certainty factor of the identification results, wherein the display format includes a color, shape, size, or position of the segmentation position.

2. The information processing apparatus according to claim 1, wherein the document includes one or more pages, and wherein the processor is configured to:

cause the display to display the pages represented by the image data; and denote, between a page and a neighboring page adjacent to the page, the segmentation position in the display format responsive to the certainty factor of the identification results.

3. The information processing apparatus according to claim 2, wherein the processor is configured to display one or more pages in a bundle as a document between the segmentation positions having the certainty factor equal to or higher than a threshold.

4. The information processing apparatus according to claim 3, wherein the processor is configured to, in response to an instruction from a user, switch between a presentation form that causes the display to display the one or more pages in the bundle as the document and a presentation form that causes the display to display, in a side-by-side fashion, the one or more pages forming the document.

5. The information processing apparatus according to claim 2, wherein the processor is configured to denote the segmentation position by the color or the shape responsive to the certainty factor.

6. The information processing apparatus according to claim 2, wherein the processor is configured to cause the display to display the pages with a mark responsive to the certainty factor attached on a page subsequent to the segmentation position.

7. The information processing apparatus according to claim 2, wherein the processor is configured to cause the display to display the pages with a distance between the page and the neighboring page changed in response to the certainty factor.

8. The information processing apparatus according to claim 1, wherein the processor is configured to change the display format of the segmentation position in response to an instruction from a user.

9. The information processing apparatus according to claim 1, wherein the processor is configured to segment the documents at the segmentation position having the certainty factor equal to or higher than a threshold.

10. The information processing apparatus according to claim 2, wherein the processor is configured to;

extract a feature from each page forming the documents; and on a per page basis, extract a difference between the feature of the page and the feature of the neighboring page; and identify the segmentation position in accordance with the difference.

11. The information processing apparatus according to claim 10, wherein the processor is configured to:

identify a top page of the documents in accordance with the difference; and identify as the segmentation position a position between the top page and a prior page prior to the top page.

12. The information processing apparatus according to claim 10, wherein the processor is configured to:

identify a final page of the documents in accordance with the difference; and identify as the segmentation position a position between the final page and a subsequent page subsequent to the final page.

13. The information processing apparatus according to claim 10, wherein the processor is configured to:

identify a top page and a final page of the documents in accordance with the difference; and identify the segmentation position in accordance with the identification results.

14. The information processing apparatus according to claim 13, wherein the processor is configured to cause the display to display the display format of the segmentation position that is different depending on whether the segmentation position is prior to the top page or subsequent to the final page or the segmentation position is prior to the top page and subsequent to the final page.

15. A non-transitory computer readable medium storing a program causing a computer to execute a process, the process comprising:

performing on image data representing a plurality of documents an operation that identifies a segmentation position that segments the documents according to a document unit; and causing a display to display identification results in a display format that is responsive to a certainty factor of the identification results, wherein the display format includes a color, shape, size, or position of the segmentation position.

16. An information processing method comprising:

performing on image data representing a plurality of documents an operation that identifies a segmentation position that segments the documents according to a document unit; and causing a display to display identification results in a display format that is responsive to a certainty factor of the identification results, wherein the display format includes a color, shape, size, or position of the segmentation position.

* * * * *